3,302,995
SYNTHETIC SWELLING LITHIUM ALUMINUM
SILICATE HYDRATE PRODUCT
Thomas D. Oulton, Watchung, N.J., assignor, by mesne assignments, to the United States of America as represented by the United States Atomic Energy Commission
No Drawing. Filed May 1, 1963, Ser. No. 277,084
3 Claims. (Cl. 23—111)

This invention relates to a new synthetic crystalline lithium aluminum silicate hydrate product having a unique crystal structure and physical properties.

Various lithium aluminum silicate hydrate products have been synthesized in the past. Some of these lithium aluminum silicate products were essentially amorphous, i.e., X-ray diffraction patterns of the silicates did not exhibit characteristic well-defined diffraction maxima. Other synthetic lithium aluminum silicate hydrates were distinctly crystalline and exhibited characteristic X-ray diffraction patterns from which the unit cell dimensions of the lithium aluminum silicate crystal could be ascertained. Exemplary of crystalline lithium aluminum silicate hydrates are the following: the crystalline aluminum silicate hydrate known in the art as the "Barrer A" zeolite and identified in ASTM Card 5–0181 of the card index issued by the American Society for Testing Materials; the novel crystalline lithium aluminum silicate hydrate described in a copending application, Serial No. 142,762, filed October 4, 1961, now issued as U.S. 3,123,441, by Walter L. Haden, Jr., et al.; and the lithium exchanged form of the synthetic crystalline metallic aluminum silicate known as "zeolite A" and described in U.S. 2,882,243 to Milton. The aforementioned crystalline lithium aluminum silicate hydrates, like many other metallic aluminum silicates, are characterized by a rigid three-dimensional network, a property that is generally characteristic of crystalline zeolites.

The present invention results from the surprising and unexpected discovery that a unique crystalline lithium aluminum silicate hydrate which is fundamentally different in structure and physical properties from known crystalline lithium aluminum silicate hydrates can be synthesized from suitable reactants, by controlled hydrothermal treatment, as described hereinafter.

Accordingly, an object of this invention is to provide a new hydrated lithium aluminum silicate product.

A more particular object is to provide a new crystalline lithium aluminum silicate hydrate product having unique and valuable characteristics.

Another object is to provide a unique lithium aluminum silicate hydrate characterized by a three-layer expandable crystal structure.

Yet another object is to provide a new inorganic colloidal thickening or suspending agent.

Still another object is to provide a synthetic swelling inorganic silicate material physically similar to certain swelling clays but of different chemical composition from clays and free from objectionable colored and heavy metal impurities normally present in naturally occurring clays.

Stated briefly, the novel synthetic crystalline product of the subject invention is a lithium aluminum silicate hydrate, the atoms of which are oriented in a unit cell in an expandable three-sheet layer arrangement, an arrangement which is unique for a lithium aluminum silicate hydrate product.

This new swelling silicate product has been obtained in varying degrees of purity by hydrothermal treatment of aqueous gels obtained by mixing lithium hydroxide with a dilute silica hydrosol and a particular form of colloidal alumina, namely, fibrous alumina monohydrate carrying a positive electrical charge and having the crystal lattice of boehmite. The $Li_2O:Al_2O_3$ mol ratios in these gels have varied from about 2 to 4:1 and the $SiO_2:Al_2O_3$ mol ratios have varied from about 8 to 16:1. Hydrothermal treatment was carried out at about 230° C. with saturated steam. The swelling lithium aluminum silicate hydrate has also been obtained by hydrothermal treatment with saturated steam at about 230° C. of alkaline aqueous slurries composed of lithium hydroxide, silica hydrosol and aluminum chloride, using mol ratios of $Li_2O:Al_2O_3:SiO_2$ of about 3:1:8, the theoretical chemical composition of the pure expandable lithium aluminum silicate hydrate (as determined by analysis of the X-ray powder diffraction properties of the product of the invention).

The lithium aluminum silicate hydrate of the subject invention is useful as an inorganic colloidal thickening agent for polar liquids. When the silicate hydrate is immersed in various polar liquids, such as water, the liquid penetrates between the sheets composing the unit cell of the crystal lattice and expands the crystal to a degree which varies with the nature of the liquid. This results in a swelling of the silicate crystals, whereby the liquid is bodied or thickened by the solvated silicate crystals. The thickened liquid can be used to suspend solid particulate matter, such as pharmaceuticals.

A marked advantage of the product of this invention over colloidal clay thickening agents, such as Wyoming bentonite, is that the lithium aluminum silicate hydrate of this invention can be obtained as a very white powder that is virtually free from heavy metal impurities. In this respect, the product of this invention represents a marked improvement over mineral thickening agents which are normally associated with lattice-held colored contaminants and also contain heavy metal impurities.

For some applications it may be desirable to baseexchange at least some of the lithium ions of the lithium ions of the lithioum aluminum silicate hydrate with other cations, such as sodium ion. Ion-exchange techniques well known to those skilled in the art can be used to effect the ion exchange.

The structure of the product of this invention has been elucidated by diagnostic X-ray diffraction studies using standard techniques and $CuK\alpha$ X-radiation. The lithium aluminum silicate hydrate has been found to have a diffuse random powder diffraction pattern exhibiting a first order basal reflection line at about 12 A., varying within the range of 12.1 A. to 12.3 A. for different samples and exhibiting characteristic second and third order basal reflections at about 6 A. and about 3 A., respectively. These reflections are markedly reinforced by orienting the specimen of the lithium aluminum silicate hydrate on the X-ray film. Glycolation of the oriented specimen (i.e., exposing an oriented specimen to ethylene glycol vapors) expands the first order basal reflection from about 12 A. to about 16 A. and expands the reflection at about 3 A. by a similar degree of magnitude. It will be familiar to those skilled in the interpretation of X-ray diffraction data that these properties are characteristic of a three-layer crystalline material in which the c-axis of the unit cell expands from about 12 A. to about 16 A. upon glycolation.

The following example is given for illustrative purposes.

A well-crystallized specimen of the synthetic lithium aluminum silicate hydrate of this invention was produced from the following ingredients which were selected to provide a $Li_2O:Al_2O_3:SiO_2$ mol ratio of 4.1:1.0:10.2.

Reagents: Reagent quantity
LiOH (4.78 M aqueous solution) --- 57.5 ml.=13.743×10² mols $Li_2O$.
"Baymal"[1] ---------- 4.84 g.=3.353×10² mols $Al_2O_3$.
"Ludox"[2] ---------- 55.8 ml.=34.099×10² mols $SiO_2$.
Water (distilled) ----- 136.7 ml.

[1] Fibrous form of colloidal alumina monohydrate having the crystal lattice of boehmite and described in U.S. Patent No. 2,915,475, December 1, 1959, to Bugosh.

| | Wt. percent |
|---|---|
| AlOOH | 83.1 |
| $CH_3COOH$ | 9.8 |
| $SO_4$ | 1.7 |
| $H_2O$ | 5.0 |
| $NH_4$ | 0.2 |
| Na | 0.07 |
| Fe | 0.02 |
| $SiO_2$ | 0.02 |
| | 99.91 |

Typical properties of "Baymal" are reported to be as follows:
Specific surface area ---------- 274 m²/g.
Pore volume -------------------- 0.53 cc./g.
Pore diameter ------------------ 77 A.
pH—4% sol. -------------------- 3.8 (with KCl bridge calomel cell).
Particle change in sol. --------- Positive.

[2] A dilute silica hydrosol containing 0.367 g. $SiO_2$/ml.

Mixing of ingredients was carried out at ambient temperature in a malted milk type mixer (Hamilton Beach, Model 40DM) having a single impeller shaft about 6 inches in length, a shaft speed of 14,000 r.p.m. and a corrugated disc impeller having a diameter of about 1 inch. The "Baymal" was added to water in the stainless steel cup of the mixer and stirred for one minute. "Ludox" was then added and stirred for one minute. The lithium hydroxide solution was then added to the contents of the cup and the mixture stirred for 5 minutes. Twenty-five ml. of the resultant slurry was placed in a 50 ml. high silica (Vycor) test tube. The uncovered test tube was placed upright in a 1 liter electrically heated autoclave which contained about 100 ml. of water. The top of the test tube was above the water line in the autoclave and the base of the test tube was supported by the base of the autoclave. The autoclave was sealed tightly and the contents maintained at about 230° C. (saturated steam pressure of about 480 p.s.i.) for 55 hours. The solids in the test tube were then filtered and washed with about 50 ml. of distilled water which was added to the filtrate. The pH of the mixed washings and filtrate was 11.5. The lithium aluminum silicate hydrate product was dried at about 100° C.

X-ray powder diffraction patterns were obtained of the lithium aluminum silicate hydrate product by standard techniques, employing a Kα doublet of copper as the source of X-radiation, a Geiger counter spectrometer, a Norelco sample holder having a sample area of 0.812" x 0.408", and a strip chart pen recorder. The patterns were obtained with a receiving slit width of 0.006", a 3° take-off angle, a scanning rate of 2° 2θ per minute and a time constant of 4 seconds. Scanning direction was from 2° to 90°. The relative intensities of the peaks (100 $I/I_0$) and the interplanar spacings ($d$ values in Angstrom units) were calculated from the peak heights and positions recorded on the strip chart.

One set of reflections was obtained from a specimen with random orientation by placing a dry sample of the lithium aluminum silicate hydrate in the well of a glass slide and equilibrating the sample at 25° C. and 40% to 50% relative humidity for 18 hours. Another set of reflections was obtained from a specimen with orientation parallel to the basal plane. This oriented specimen of the product was prepared by allowing an aqueous dispersion of the lithium aluminum silicate hydrate to dry on a glass slide and then equilibrating the slide at 25° C. and 40% to 50% relative humidity for 18 hours. A third set of reflections was obtained from a glycolated oriented specimen prepared by placing small drops of ethylene glycol around the edges of the dry oriented specimen which had been prepared from the water suspension of the lithium aluminum silicate hydrate. The glycol was added dropwise to the oriented specimen in amount sufficient to saturate the sample and the oriented glycolated specimen was exposed to the glycol vapor for over an hour before X-raying.

The significant $d$ values and corresponding relative line intensities calculated from the three X-ray powder diffraction patterns are reported in table form.

All X-ray diffraction data in the specification and claims refer to data obtained with X-ray powder diffraction equipment and with the operating conditions described hereinabove. Those skilled in the art will recognize that when scanning in a direction from 90° to 2° observed $d$ values and line intensities may vary somewhat from values obtained when the scanning direction is from 2° to 90°. It will also be apparent that observed $d$ values and line intensities of the product of this invention may fall slightly outside of the scope of the limits set forth in the specification and claims when scanning at rates other than 2° 2θ per minute or with time constants appreciably less than or greater than 4 seconds. The skilled crystallographer will readily distinguish those variations in X-ray diffraction patterns which are attributable to the method of obtaining the X-ray.

X-RAY DIFFRACTION CHARACTERISTICS OF SWELLING LITHIUM ALUMINUM SILICATE HYDRATE

| Index | Random Powder Pattern | | Oriented Film | | Glycolated Oriented Film | |
|---|---|---|---|---|---|---|
| | $d$ Value, A. | 100 $I/I_0$ | $d$ Value, A. | 100 $I/I_0$ | $d$ Value, A. | 100 $I/I_0$ |
| 001 | 12.3 | 100 | 12.3 | 100 | 16.7 | 100 |
| 002 | 6.1 | 30 | 6.1 | 25 | | |
| 003 | | | | | 5.5 | 20 |
| hk | 4.5 | 70 | 4.5 | 40 | 4.5 | 20 |
| 004 | 3.06 | 30 | 3.06 | 20 | | |
| 005 | 2.56 | 30 | 2.56 | 20 | 3.32 | 10 |
| 006 | | | | | 2.79 | 10 |
| hk | | | 2.49 | 20 | 2.49 | 20 |

I claim:

1. A crystalline synthetic lithium aluminum silicate hydrate containing mol ratios of $Li_2O:Al_2O_3:SiO_2$ of about 3:1:8, the atoms of said lithium aluminum silicate hydrate being oriented in a unit cell in an expandable three-layer sheet arrangement in which the $c$-axis spacing of said unit cell expands from about 12 A. to about 16 A. upon glycolating an oriented specimen of said lithium aluminum silicate hydrate.

2. Crystalline synthetic lithium aluminum silicate hydrate, the atoms of which are oriented in a unit cell in such a manner that a random X-ray powder diffraction pattern of said lithium aluminum silicate hydrate is diffuse and exhibits a first order basal reflection at about 12 A., said lithium aluminum silicate hydrate being further characterized by the fact that said first order basal reflection at 12 A. is strengthened by orienting a specimen of said lithium aluminum silicate hydrate and is shifted to about 16 A. upon glycolating an oriented specimen of said lithium aluminum silicate hydrate, said lithium aluminum silicate hydrate containing from 2 to 4 mols $Li_2O$ per mol $Al_2O_3$ and from 8 to 16 mols $SiO_2$ per mol $Al_2O_3$.

3. The crystalline synthetic lithium aluminum silicate hydrate of claim 2 which contains about 3 mols $Li_2O$ per mol $Al_2O_3$ and about 8 mols $SiO_2$ per mol $Al_2O_3$.

References Cited by the Examiner

Barrer et al.: J. Chem. Soc. (1951), pages 1267–1278.

OSCAR R. VERTIZ, *Primary Examiner.*

E. J. MEROS, *Assistant Examiner.*